United States Patent
Calvert (10) Patent No.: US 9,488,298 B2
(45) Date of Patent: Nov. 8, 2016

(54) TIE DEVICE FOR ELONGATE ARTICLES

(75) Inventor: Christopher John Calvert, York (GB)

(73) Assignee: Ellis Patents Holdings Limited, Malton, North Yorkshire (GB)

( * ) Notice: Subject to any disclaimer, the term of this patent is extended or adjusted under 35 U.S.C. 154(b) by 883 days.

(21) Appl. No.: 13/574,688

(22) PCT Filed: Jan. 19, 2011

(86) PCT No.: PCT/GB2011/050084
§ 371 (c)(1),
(2), (4) Date: Nov. 6, 2012

(87) PCT Pub. No.: WO2011/089425
PCT Pub. Date: Jul. 28, 2011

(65) Prior Publication Data
US 2013/0047409 A1    Feb. 28, 2013

(30) Foreign Application Priority Data

Jan. 21, 2010 (GB) .................................. 1000963.7
Jul. 1, 2010 (GB) .................................. 1011071.6

(51) Int. Cl.
*F16L 3/137* (2006.01)
*F16L 3/233* (2006.01)
(Continued)

(52) U.S. Cl.
CPC ................ *F16L 3/137* (2013.01); *F16L 3/233* (2013.01); *H02G 3/263* (2013.01); *H02G 3/32* (2013.01); *Y10T 24/1416* (2015.01); *Y10T 29/49947* (2015.01)

(58) Field of Classification Search
CPC ........... F16L 3/137; F16L 3/123; F16L 3/12; B23P 11/00; H02G 3/32; Y10T 29/49947; Y10T 24/1416

USPC .. 24/269, 68 R, 69 ST, 70 ST, 71 ST, 68 BT, 24/69 TM, 71 R, 71 TT, 68 D, 182, 193, 24/196, 197, 200, 464; 269/131; 29/525.01; 248/49–64

See application file for complete search history.

(56) References Cited

U.S. PATENT DOCUMENTS 472,927 A * 4/1892 Kidd .................. B21F 9/00 254/214
498,780 A * 6/1893 Franken ................. F16L 33/14 24/269

(Continued)

FOREIGN PATENT DOCUMENTS

DE 333329 C 7/1921
FR 595684 * 4/1924

(Continued)

OTHER PUBLICATIONS

Ellis Patents Cable Cleats online catalogue website at: www.ellispatents.co.uk/ products/flexi-strap.*

(Continued)

*Primary Examiner* — Monica Carter
*Assistant Examiner* — Mahdi H Nejad
(74) *Attorney, Agent, or Firm* — Banner & Witcoff, Ltd.

(57) ABSTRACT

A device for holding together elongate objects such as high-power electrical cables has a frame (30), a strap (12) designed to be fixed at one end to the device and to pass round the cables back to the device with its other end, a spindle (20) rotatably mounted in the frame so as to be generally parallel to the elongate objects in use, the other end of the strap being attachable to the spindle once passed round the cables, and then wound round the spindle by turning the latter in order to tighten the strap round the objects; and a locking mechanism constituted by at least one non-circular section of the spindle (20) and a matching non-circular aperture (33) in the frame, and by the spindle being displaceable along its length with respect to the frame by tightening a locknut (22) so that the non-circular section engages in the corresponding aperture when it is desired to lock it against rotation.

9 Claims, 9 Drawing Sheets (51) Int. Cl.
*H02G 3/00* (2006.01)
*H02G 3/32* (2006.01)

(56) References Cited

U.S. PATENT DOCUMENTS

| | | | | |
|---|---|---|---|---|
| 640,049 A * | 12/1899 | Terry | ............... | E04H 17/266 256/42 |
| 1,177,500 A * | 3/1916 | Dolson | ............... | F16L 55/172 138/99 |
| 1,282,848 A * | 10/1918 | Jones | ............... | F16L 33/14 24/269 |
| 1,292,801 A * | 1/1919 | Keogh | ............... | F16G 15/06 16/381 |
| 1,305,737 A * | 6/1919 | Neiglick | ............... | F16L 33/14 24/269 |
| 1,490,618 A * | 4/1924 | McKinney | ............... | 24/269 |
| 1,627,172 A * | 5/1927 | Gouirand | ............... | F16L 33/14 24/269 |
| 1,963,436 A * | 6/1934 | Dumke | ............... | 24/269 |
| 2,383,199 A * | 8/1945 | Kitts | ............... | F16L 33/14 24/269 |
| 2,388,371 A * | 11/1945 | Staff | ............... | 24/269 |
| 2,480,755 A * | 8/1949 | McElroy | ............... | 24/269 |
| 2,780,429 A * | 2/1957 | Vanier | ............... | F16L 3/14 248/328 |
| 3,416,763 A * | 12/1968 | Moreno | ............... | F16G 11/12 211/119.15 |
| 3,638,912 A * | 2/1972 | Moreno | ............... | 24/68 R |
| 3,754,733 A * | 8/1973 | Foster | ............... | 24/68 R |
| 3,848,889 A * | 11/1974 | Sharrow | ............... | 410/103 |
| 3,884,450 A * | 5/1975 | Brammer | ............... | B60P 7/083 24/269 |
| 3,988,007 A * | 10/1976 | Freiburger, Jr. | ............... | 24/68 R |
| 4,040,602 A * | 8/1977 | Foster, Sr. | ............... | 24/68 R |
| 4,234,166 A * | 11/1980 | Cederblad | ............... | 24/68 CD |
| 4,388,748 A * | 6/1983 | Riedel | ............... | 24/269 |
| 4,397,436 A * | 8/1983 | Lyon | ............... | F16L 3/233 24/269 |
| 4,604,773 A * | 8/1986 | Weber | ............... | B60N 2/2821 24/269 |
| 4,675,949 A * | 6/1987 | DaCosta | ............... | 24/269 |
| 5,156,506 A * | 10/1992 | Bailey | ............... | 410/100 |
| 5,853,164 A * | 12/1998 | Hunt | ............... | 254/213 |
| 6,322,279 B1 * | 11/2001 | Yamamoto et al. | ............... | 403/97 |
| 6,520,487 B2 * | 2/2003 | Crichton | ............... | F16G 11/12 256/40 |
| 6,530,546 B1 * | 3/2003 | Cyrell | ............... | A47H 1/19 248/125.2 |
| 9,353,892 B2 * | 5/2016 | Frizzell | ............... | F16L 3/137 |

FOREIGN PATENT DOCUMENTS

| | | | |
|---|---|---|---|
| FR | 595684 | * | 6/1924 |
| FR | 595684 | * | 7/1925 |
| FR | 595684 A | | 10/1925 |
| FR | 2461382 A1 | | 1/1981 |
| FR | 2904084 | * | 7/2006 |
| FR | 2904084 | * | 1/2008 |
| FR | 2904084 A1 | | 1/2008 |
| GB | 114431 A | | 7/1918 |
| GB | 2111020 | * | 4/1982 |
| GB | 2111020 A | | 6/1983 |
| GB | 1000963.7 | * | 1/2010 |
| GB | 1011071.6 | * | 7/2010 |
| WO | WO8203618 | * | 10/1982 |

OTHER PUBLICATIONS

Ellis Patents Cable Cleats Brochure; Ellis Patents © 2015; internet page address: http://www.ellispatents.co.uk/products/flexistrap.*
V10251_Ellis_EP_Brochure; electrical product catalogue.*
The Ellis Guide to Cable Cleats; Ellis Patents Ltd; 2014 Brochure.*
Electrical Product Catalogue; Ellis; 2014 Brochure.*
Ellis Patents Cable Cleats Flexi Strap; Ellis Patents© 2015.*
International Patent Application No. PCT/GB2011/050084 International Search Report and Written Opinion dated Jun. 5, 2011.
Intellectual Property Office of Great Britain, "Search Report," issued in connection with GB1000963.7, Apr. 26, 2010, 1 page.
Intellectual Property Office of Great Britain, "Search Report," issued in connection with GB1011071.6, Oct. 21, 2010, 1 page.

* cited by examiner

TIE DEVICE FOR ELONGATE ARTICLES

CROSS REFERENCE TO RELATED APPLICATIONS

This is a U.S. National Phase Application under 35 U.S.C. §371 of International Application No. PCT/GB2011/050084, filed Jan. 19, 2011, which was published under PCT Article 21(2) and claims priority to United Kingdom Patent Application Nos. GB 1000963.7 and GB 1011071.6, filed Jan. 21, 2010 and Jul. 1, 2010, respectively, the entire contents of which are incorporated herein by reference in their entireties for any and all non-limiting purposes.

The present invention relates to devices for tightening metal or fabric bands around pipes, cables and other elongate structures and then locking the band when tensioned. Applications include the clamping of high-current electrical cables together so that they can withstand the high forces induced when a short-circuit occurs, and the fastening of signposts to metal poles.

In the case of the first application mentioned, if the cables are tied down with a fixing of insufficient strength, such as a nylon cable tie for example, then in the event of a short-circuit the cables will break away from the fixing, causing significant damage to the surroundings and themselves. The cables need to be tied together with a device strong enough to hold them together until the circuit-protection measures are enabled. It is therefore known to use cable clamps, otherwise known as cleats, to secure three-phase cables. One such clamp is shown in GB 2261014 A by EDL Cable Supports Ltd. The cleat has a solid base member and a strap of steel sheet formed into a loop round the three cables or cores. The loop is tightened using a bolt which pulls one of the ends of the strap tight. A solid, polygonal clamp is also conceivable for a given size of cable, as shown in the inventor's earlier GB 2389970 A or in GB 2284444 A.

A solid base is needed in order to fix the cleat to a surface, such as a tunnel wall. However, for most cables the spacing of such wall fixings need only be every meter or so, while to contain the cable in the event of a high short-circuit the specification is every 0.6 m. What is frequently done, therefore, is to space the wall fixings at intervals up to 1.8 m and at each intermediate point to have a "floating" strap or tie that simply holds the cables together but does not support them. The invention is concerned partly with straps of this kind, but it is applicable also to any installation where a heavy-duty tie is required.

An example of a strap system for electrical cables is shown in BICC's European patent no. EP 125099. The strap is tightened round the cables by attaching one end to a small plate with upstanding sidewalls, the other end of the strap being fitted to a rod or key rotating in holes in the sidewalls. The key is turned by a rectangle of wire forming a handle or frame, and when the strap is tight enough the handle is folded over so that the sides of the rectangle engage in slots in the side walls. This system is cheap but not easy to operate.

FR 595684 (René Hourseau) shows a clip for a hose which once tightened is held in position by a simple axial displacement. For instance, the spindle with the strap has a key handle, and pins extending from the key are pushed into holes in the frame wall. This is adequate for inert, relatively light-duty applications, but would not be adequate for the violent agitation that has to be withstood in an electrical cabling environment.

According to the present invention there is provided a retaining device or clamp for electrical cables or other elongate articles, comprising a frame, a strap designed to be fixed at one end to the device and to pass round the cables back to the frame with its other, free, end, a spindle rotatably mounted in the frame so as to be generally parallel to the cables in use, the free end of the strap being attachable to the spindle once passed round the elongate articles, and then wound round the spindle by turning the latter in order to tighten the strap round the elongate articles; and a locking mechanism adapted to prevent the spindle from turning back once sufficient tightness has been achieved; in which the locking mechanism is constituted at least in part by a non-circular section of the spindle and a matching non-circular aperture in the frame, and by the spindle being displaceable along its length with respect to the frame so that the non-circular section engages in the corresponding aperture when it is desired to lock it against rotation. For additional robustness there can be two such non-circular section pairs, one either side of the strap. The non-circular section can for instance be square, but other shapes are conceivable. A regular polygon has the advantage of affording more than one rotary position for locking purposes.

In one type, the retaining device has a strap or band that is permanently attached at the first end to the frame, say by a loop and/or a weld. This embodiment is easy to handle and use. The system is very robust and the attachment of the free end can even turn out to be stronger than the loop or weld by which the first end of the strip is attached to the frame.

Alternatively the band can be separate from the frame and spindle, and in a particularly advantageous form cut to length in situ, so that the device is cheap and the length can be matched to the job in hand. In this case the length of strap is fitted to the spindle at one end, e.g. by passing it through a slot in the spindle, the end then being bent over to secure the end, passed round the cables etc. as before and then at its other end inserted into the spindle again, at the opposite side. Both ends of the strap are then wound round the spindle when it is tightened.

The spindle would normally have an arresting mechanism to maintain the engagement of the non-circular parts. To this end it can for instance be square in section for most of its length, but having a cylindrical end, acting as a journal loosely rotating in a square aperture in the frame while the strap is being tightened; the cylindrical end also has a thread and a locking nut, so that when the locking nut is tightened it draws the square section of the spindle into the square aperture in order to lock the strap. The spindle can thus be locked in any of four positions of rotation. In the alternative where both sides of the frame have a square-section aperture, the spindle has two corresponding journal parts and square parts.

So that the square section does not accidentally engage the aperture during rotation of the spindle during the tightening process, it is preferable to interpose a spacer, in particular a soft member such as an O-ring, which is resilient enough to keep the square sections apart but is squeezed out when the locking nut is tightened. The spindle would typically have a taper between the square and round sections, and the spacer could conveniently sit on this taper before tightening. An over-size washer is also provided on the outer side, which has an internal diameter sufficient to accommodate the taper section of the spindle and a thickness corresponding to the axial length of the taper section, so that, upon locking, the square section of the spindle is fully engaged in the matching hole in the frame and the taper is concealed in the washer.

The frame is preferably a simple rectangular U-shape, with a wall at each end in which is an aperture for mounting the spindle; one of these apertures will then be the non-circular aperture as described, and the other is round, and large enough to accommodate the square section of the spindle. Alternatively, for the double-ended version, both apertures are non-circular.

In order to increase the strength of the device, the band is passed between the spindle and the frame two or three times before tightening and locking. This system is very strong and, with the locknut, is not susceptible to being worked loose by vibration. It is therefore ideal for holding cables when there is a short-circuit.

For a better understanding of the invention, embodiments of it will now be described, by way of example, with reference to the accompanying drawings, in which.

Figure 1:
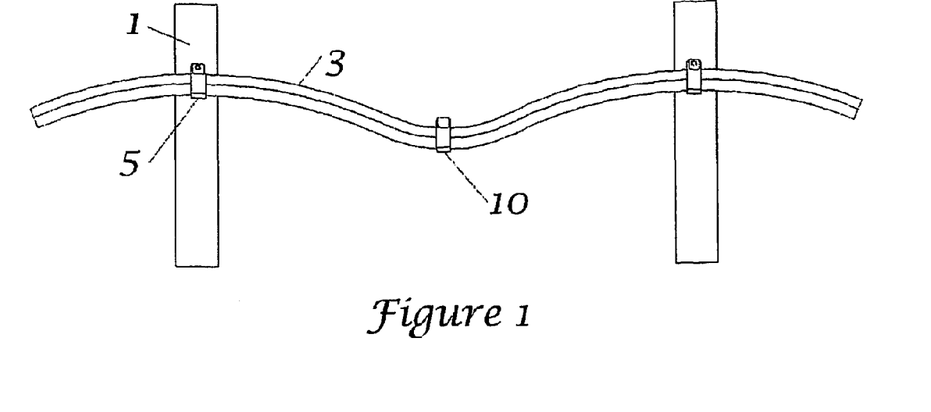
FIG. 1 shows the way cables are hung, for instance along a tunnel.

FIG. 1 shows the usual layout of a cable, or a set of three-phase cables 3, along a wall 1, for instance in a tunnel or building. At intervals of 1 to 2 meters the cables are supported and contained by cable brackets or cleats 5. In between the cleats it is desirable to provide additional binding or containment of the cables, and this is done by straps 10 as are the subject of this invention. These are not supported on the wall.

Figure 2A:
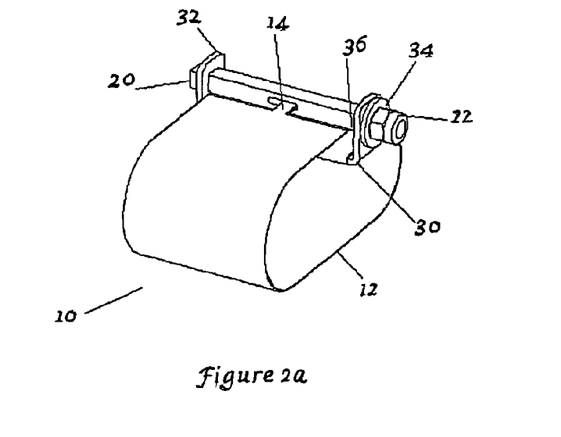
FIG. 2 shows a strap system embodying the invention.
Figure 2B:
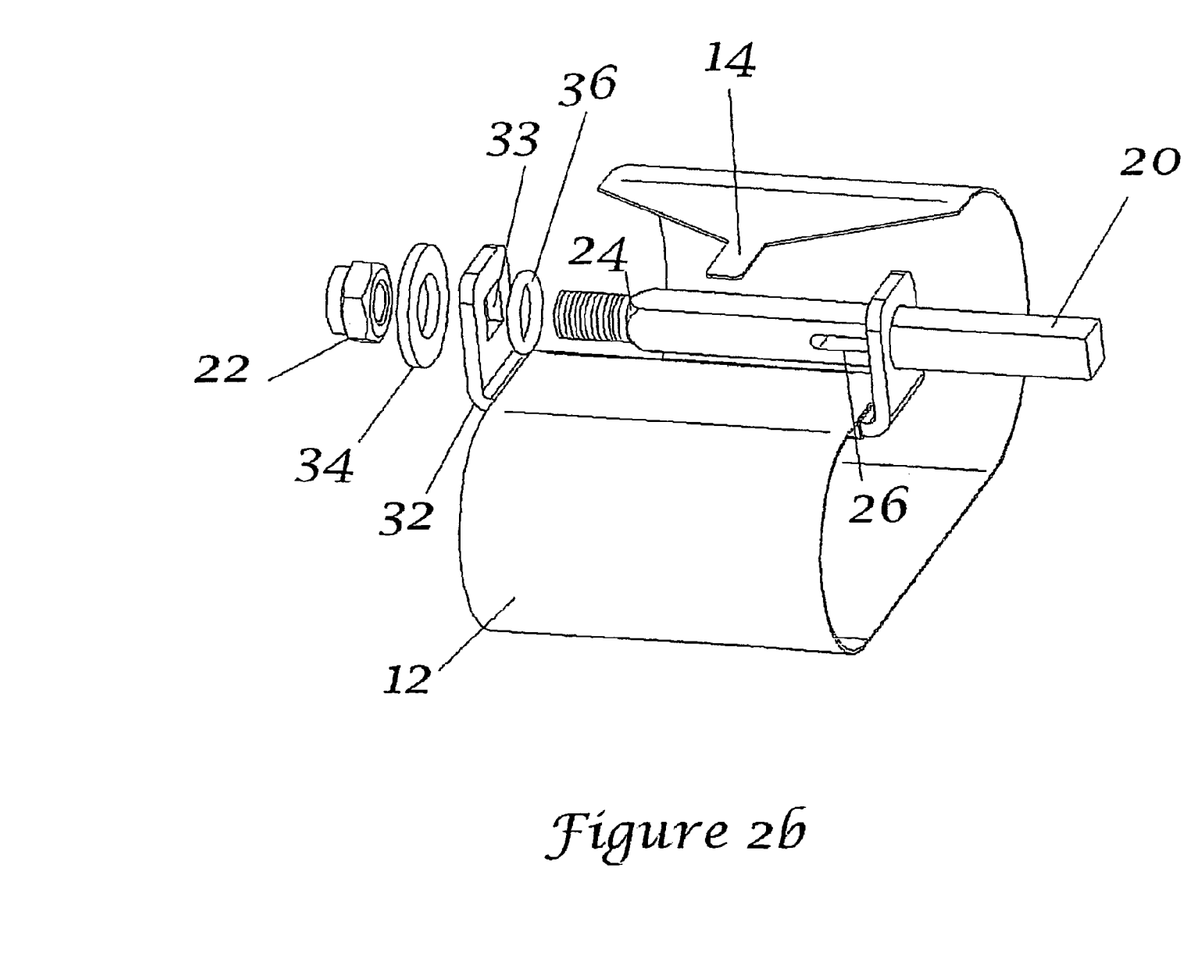

FIG. 2 shows such a strap device 10, with FIG. 2A representing the assembly and FIG. 2B an exploded view, albeit of a slightly modified version. The device is composed of a strap 12, typically of stainless steel, perhaps 5 cm wide and 0.4 mm thick, and a winding and locking device itself made up of a mainly square-section spindle 20 rotatably mounted in a frame 30. The frame extends as a bar in the width direction of the strap (i.e. the longitudinal extent of the cables) and exceeds it slightly, having two walls 32, one at each end, bent up at right angles. Each wall has an aperture, and the spindle rotates with one end in each aperture.

Figure 4:
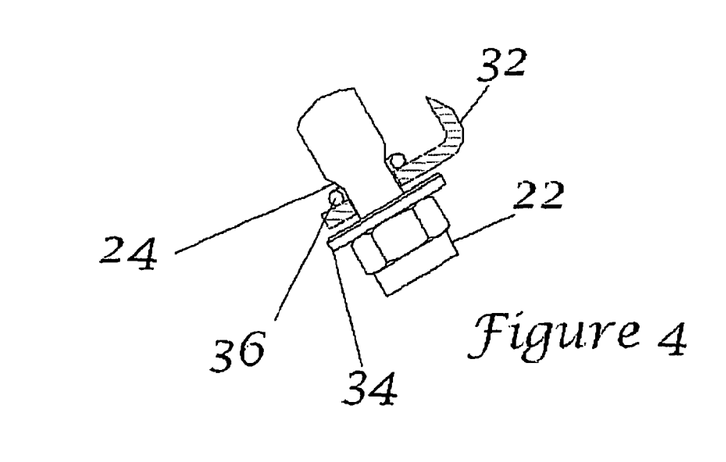
FIG. 4 shows a detail of the spindle-locking mechanism before arresting rotation.

One end of the spindle 20 is "free", and a square section protrudes so as to be accessible to a suitable tool for turning the spindle. This end rotates in a round hole, having a diameter equal to the square diagonal, in one of the walls 32 of the frame. The other end is held captive by a lock nut 22 and over-size washer 34, at the outer side, and an elastomer O-ring 36 on the inner side. The aperture 33 in the wall at this end is square and matches the square spindle section. This end of the spindle is machined down to a circular threaded section of a diameter substantially equal to the square side, so that the spindle does not rattle in the square hole. There is a taper 24 between the threaded end and the square section. The O-ring 36 sits on this taper, thus holding the square spindle section out of the aperture. This state of affairs is shown in FIG. 4.

Both frame and spindle are made of 316L stainless steel, as indeed are all the metal parts, including the lock nut, which can be a standard nylon-washer locknut.

Figure 3:
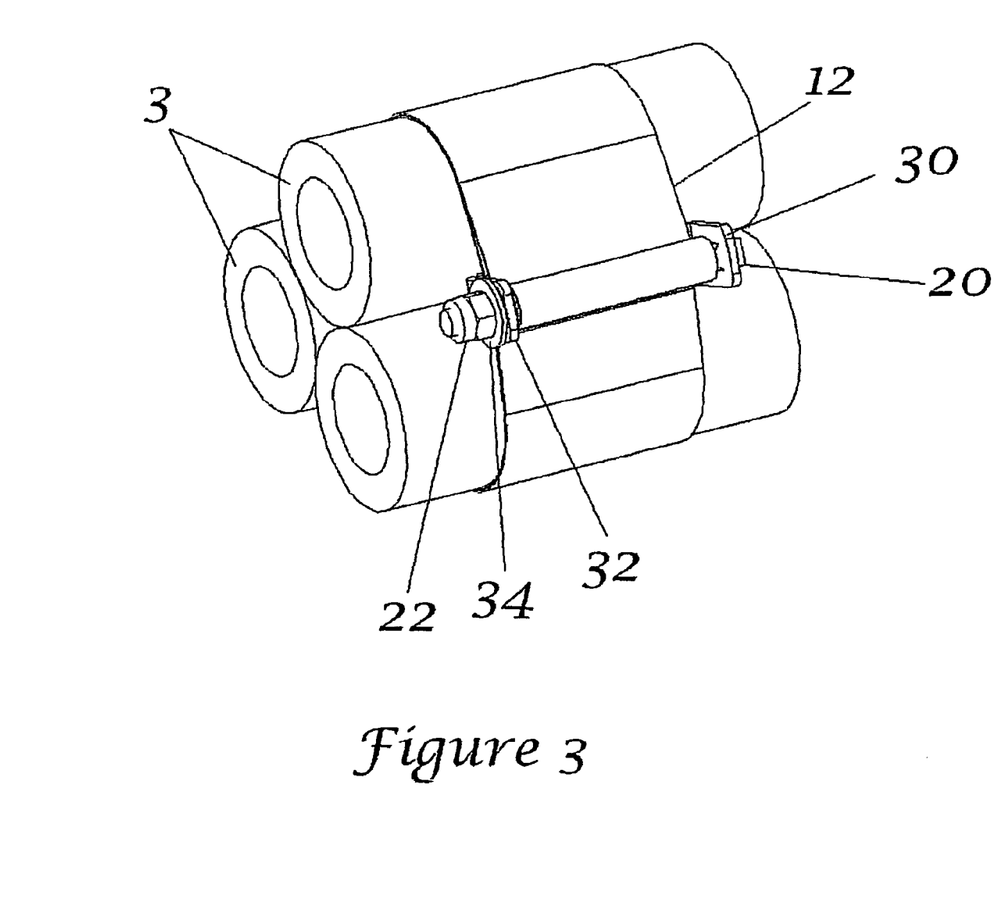
FIG. 3 shows the system in use around three cables.

In this embodiment, one end of the strap 12 is first looped, perhaps twice, round the base bar of the frame, though it could instead, or in addition, be welded. The strap is wrapped round the cables, as shown in FIG. 3, possibly two or three times, and returns to the locking device. The spindle has a slot halfway along its length, through which a tongue or tab 14 at the end of the strap can be inserted. The strap can then be tightened by winding it round the spindle, turning it using a spanner on the protruding square end.

Figure 5:
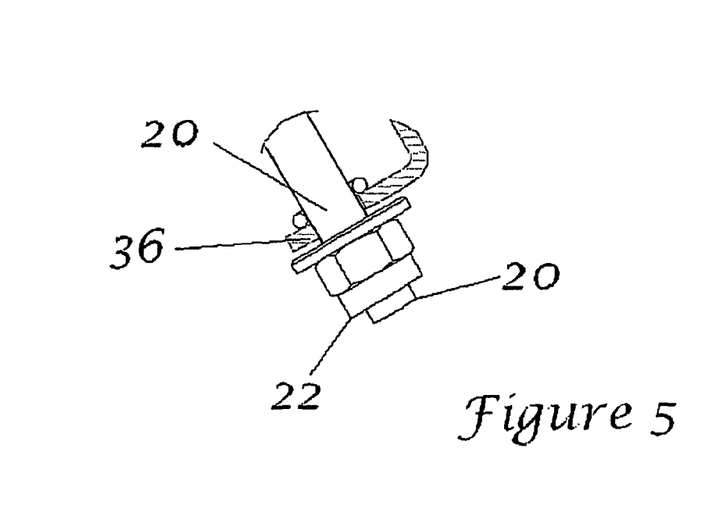
FIG. 5 shows the state after arresting.

When the strap is tight, care is taken to ensure that the square spindle section is aligned with the square aperture in the wall at the captive end of the frame, although the shape of the taper section between the threaded portion of the spindle and the square section acts to promote engagement. If the square aperture is in turn aligned with the frame walls this will generally be easy to check. The locknut is then tightened, forcing the O-ring up on to the square section of the spindle, and the square section then enters the aperture, retaining the spindle against further rotation. This is shown in FIG. 5; the threaded part and tapered section have been drawn through the aperture and are no longer visible. Clearly, the slot in the spindle must hold the strap with a sufficient initial clearance from the wall 32 for this longitudinal travel to be allowed. Ideally, the taper is entirely within the aperture in the washer 34, for maximally square engagement.

Figure 6:
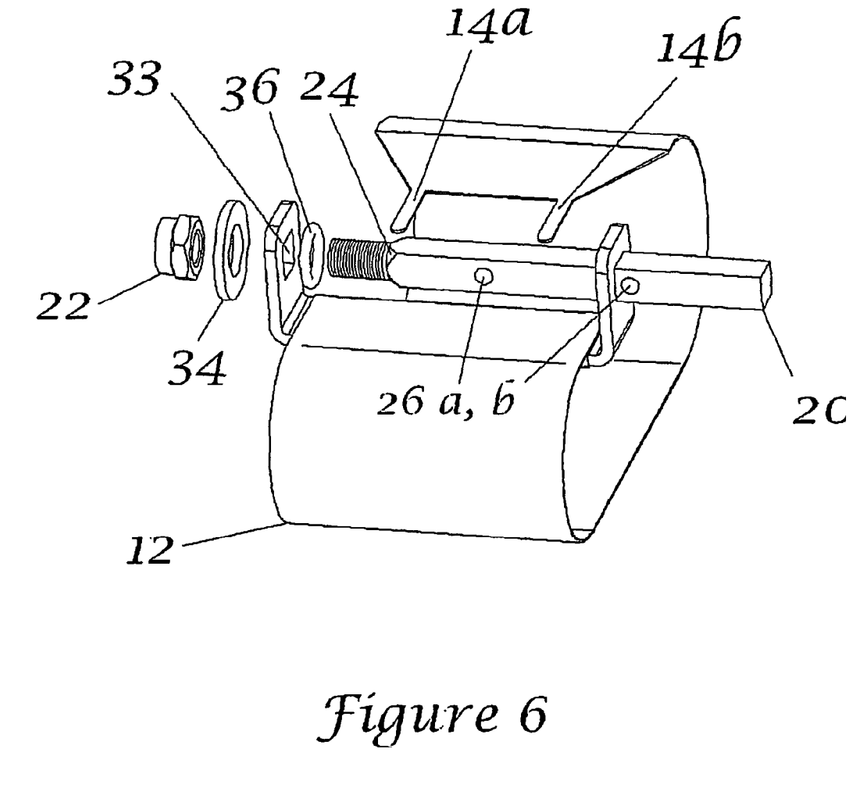
FIG. 6 shows a variant.

FIG. 6 shows a variant in which the strap 12 has two tongues 14a, 14b spaced along the width of the strap, and the spindle 20 has two correspondingly spaced holes 26a, 26b. Otherwise, this variant is identical to that of FIG. 2C.

Figure 7:
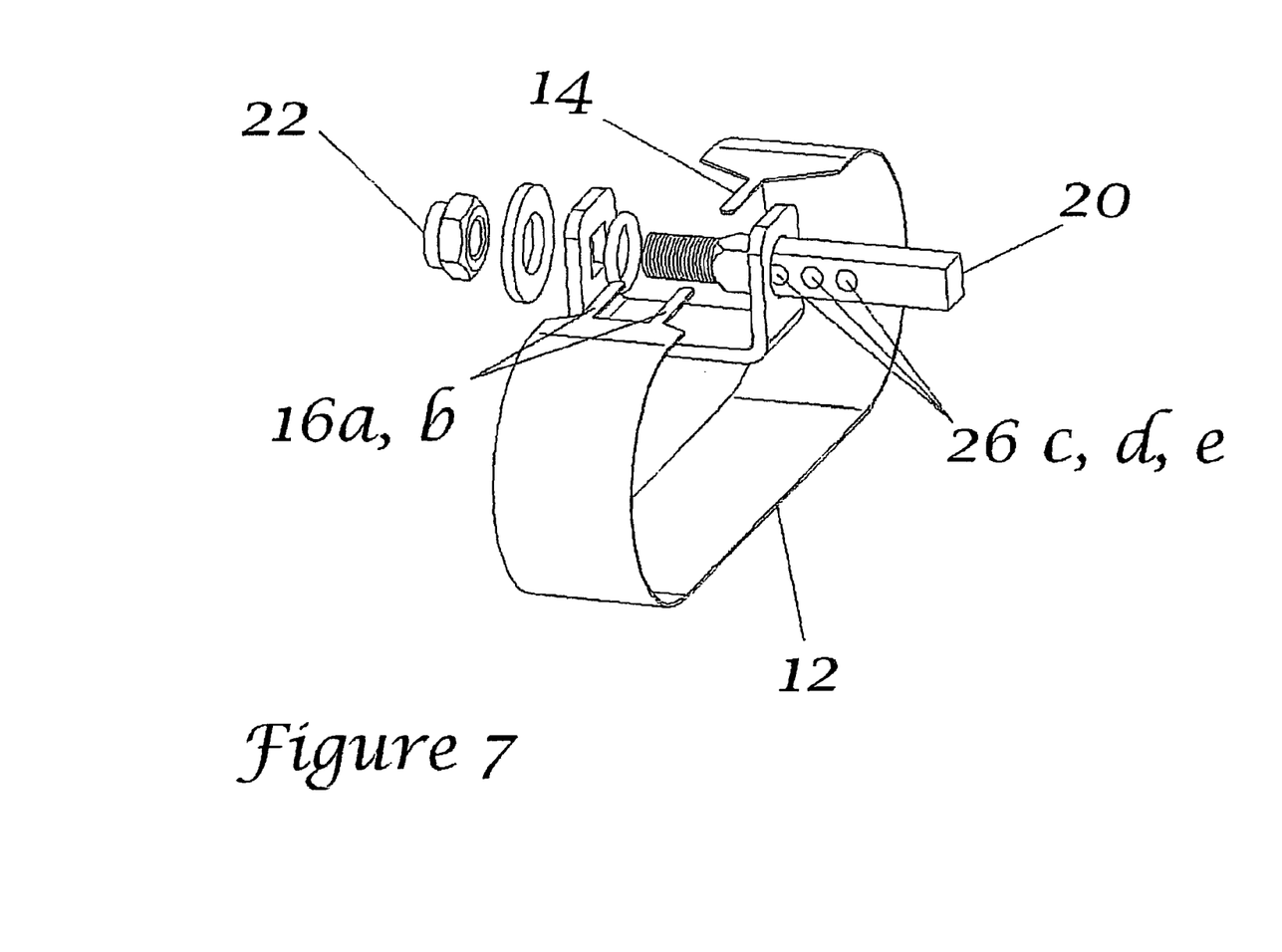
FIG. 7 shows a second embodiment in which both ends are attached to the spindle.

FIG. 7 on the other hand shows a somewhat different kind of embodiment in which both ends of the strap are fixed to the spindle. To this end one end of the strap has a tongue 14, as before, but the other end also has such a feature, here two symmetrically spaced tongues 16a, b. The spindle 20 meanwhile has three identical holes 26c, d, e that correspond—the central hole 26d to the single tongue 14 and the outer two to the two spaced tongues 16a, b. However, any non-interfering arrangement of tongues would do, so that the opposing ends did not interfere. (In fact, overlapping tongues using the same holes would be conceivable, but probably less convenient in use).

In use, the tongue or tongues of one end of the strap are inserted into the corresponding holes in the spindle and bent back to secure them, the strap is passed round the cables, pipes, post or whatever, and the other end of the strap is then inserted and the tongues likewise bent back. When the spindle is turned, both strap ends now wrap themselves alternately around the spindle, until the strap is tight. The advantage of this version is that no manufacturing or assembly step is needed for fixing the first end of the strap to the frame. Each individual strap could be of a given, predetermined length and the right length chosen for the job in hand. Alternatively, the strap can be cut to length on site using a proprietary hand tool or cutter system which forms the tongued ends.

Figure 8:
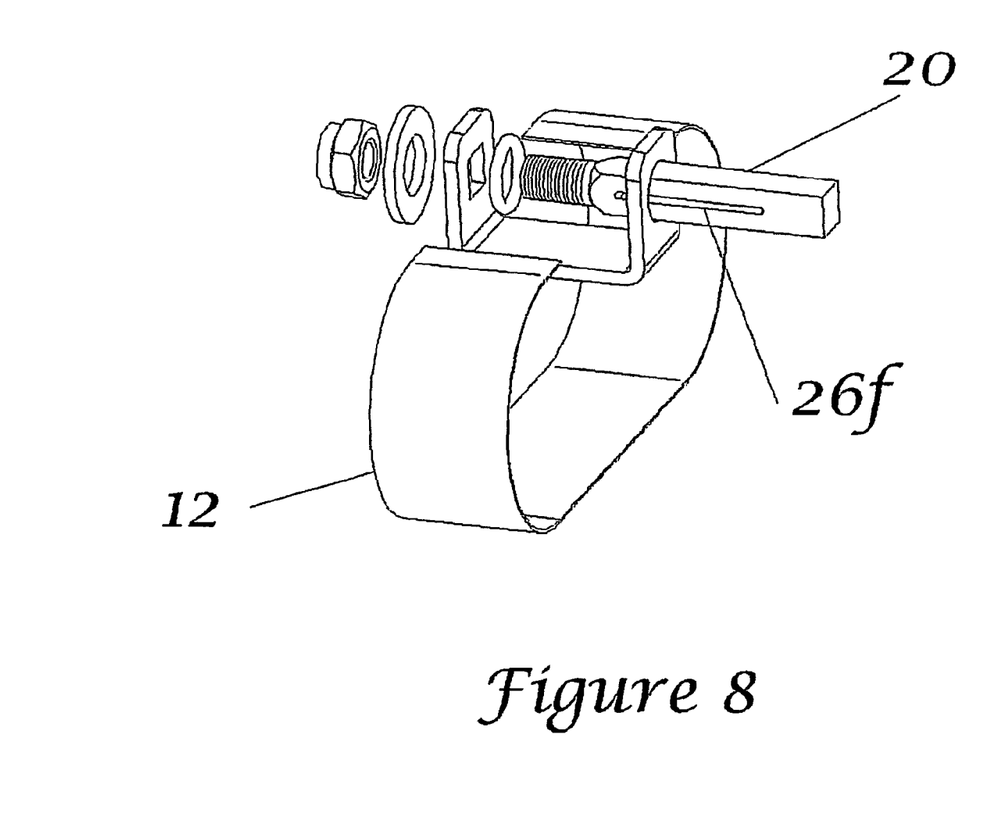
FIG. 8 shows a third embodiment with a slot in the spindle.

In a third embodiment, shown in FIG. 8, the strap has no special fixing measure at either end, but is simply cut to length with square ends. The spindle 20 meanwhile has a single slot 26f slightly wider (broader) than the strap, and deeper (wider) than twice the thickness of the strap. Here the first end is inserted and bent back, and then after passing round the cables, the second end is inserted and bent back. The spanner is then tightened as before. This embodiment has the advantage that no predetermined length of strap is dictated by the presence of a special end formation. Hence, the strap can be cut to length in situ.

The locknut can be undone and the spindle disengaged to release the strap, so the device is reusable.

Figure 9:
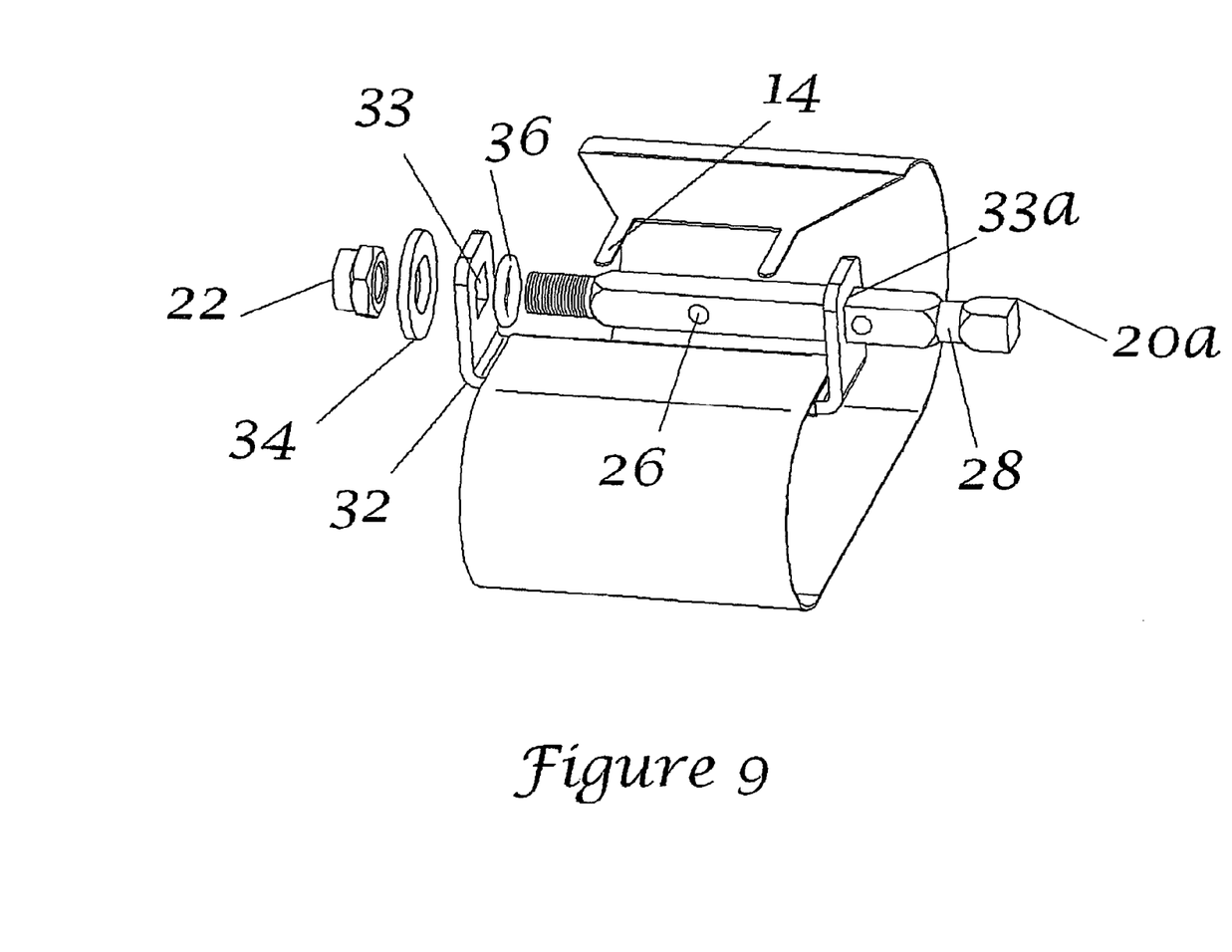
FIG. 9 shows a fourth embodiment, with the spindle engaging at both ends.

FIG. 9 shows a fourth embodiment in which the design is further improved, by punching two square holes 33, 33a in the frame walls, instead of one circular and one square hole. To allow the square-section spindle to rotate in the new square hole 33a in the wall at the other end of the frame, a groove 28 is cut in the spindle 20 at a corresponding location. The groove is a few millimeters in axial length, somewhat more than the thickness of the walls 32, and has a taper similar to the taper 24 of the free end. The end 20a of the spindle here is square also.

When the strap has been wound and is ready to be locked, the nylon locking nut is tightened as before, which pulls the spindle along into its locked position and locks the assembly at both ends rather than just one, as the square section of spindle engages in the square hole 33a.

A generally square spindle makes it easier to form the holes 26 for engaging the tongues 14 of the strap. However, the spindle does not need to have any particular cross-section except for those parts of its length that display the circular sections that rotate in the apertures and the square (or other non-circular) sections that engage in the apertures.

Figure 10:
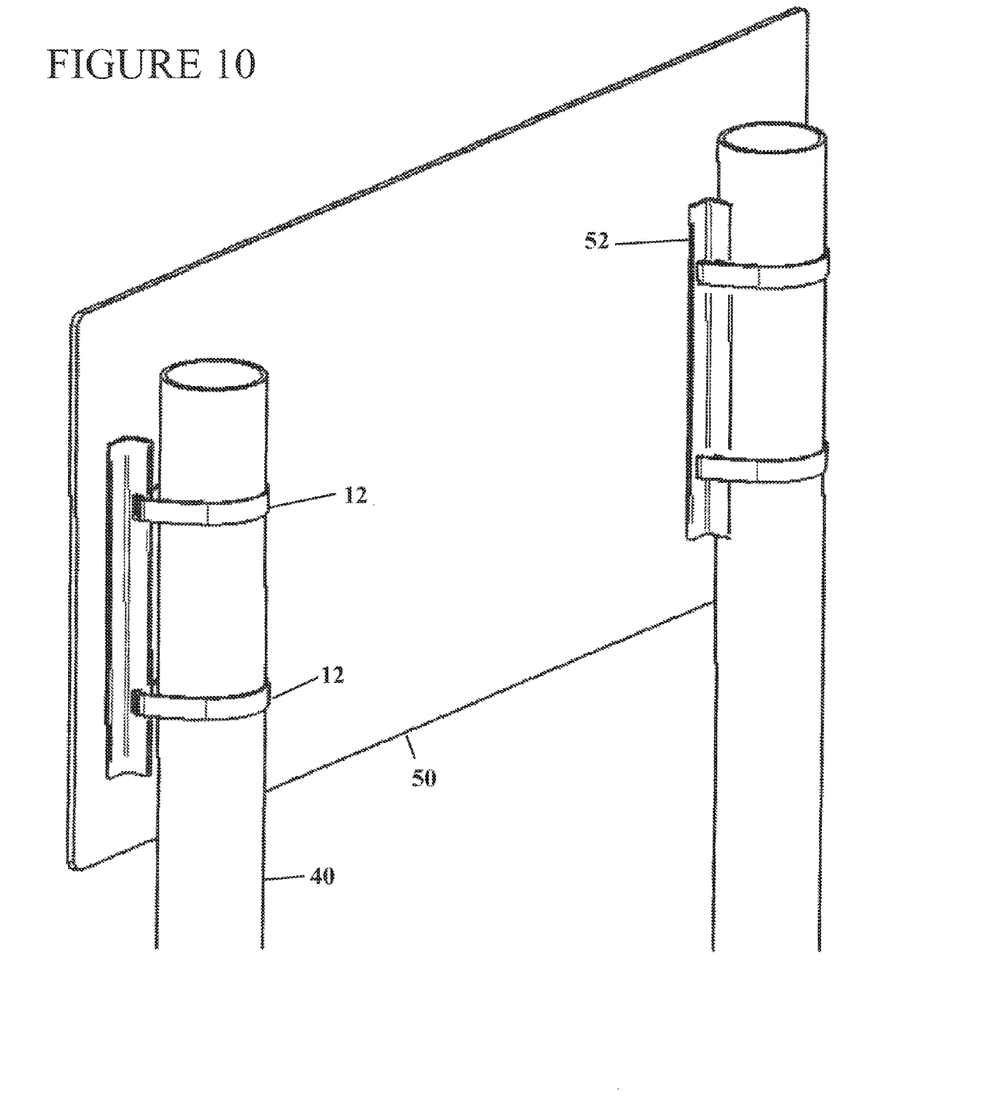
FIG. 10 shows an alternative application of the invention.

A further possible application of the invention is indicated in FIG. 10. Here four strap arrangements 12 of known type are used to tie a board 50 such as a road sign on to two metal posts 40 by way of slotted vertical angle brackets 52 fixed to the sign. Particularly for heavy-duty application, strap devices in accordance with the present invention (not shown) can be used to tighten the straps 12. The posts 40 are of course the "elongate articles" to which the invention is applicable.

Although the non-circular engaging part of the spindle in the embodiments shown is at the same end as the threaded end, they could conceivably be at opposite ends.

REFERENCE NUMERALS

1 Wall
3 Cable(s)
5 Fixed clamp
10 Floating clamp
12 Strap
14 Tongue
16 Tongue
20 Spindle
20a Square part
22 Nut
24 Taper
26 Holes, slot
28 Groove
30 Frame
32 Wall
33 Aperture
33a Square aperture
34 Washer
36 O-ring
40 Post
50 Board
52 Bracket

What is claimed is:

1. A device for holding electrical cables together, comprising:
    a frame comprising a first wall including a first non-circular aperture spaced apart from a second wall including a second non-circular aperture;
    a strap configured to be fixed at a first end within the device and to pass around the electrical cables back to the device with a second end;
    a spindle comprising a threaded end and a first non-circular section spaced apart along its length from a second non-circular section, the spindle being rotatably mounted in the first and second non-circular apertures of the frame so as to be generally parallel to the electrical cables in use, wherein the second end of the strap is configured to be attachable to the spindle once passed around the electrical cables, and then wound around the spindle by rotating the spindle with respect to the frame in order to tighten the strap around the electrical cables;
    the spindle being displaceable along its length with respect to the frame so that the non-circular section is configured to engage in the non-circular aperture to lock the spindle against rotation, the spindle further comprising a section of reduced diameter at a location corresponding to the second non-circular aperture when the spindle is in an unlocked position, wherein the section of reduced diameter comprises an annular groove having an axial length that is more than a thickness of the second wall; and
    a lock nut threaded on the threaded end of the spindle and configured to be tightened to displace the spindle along its length and draw the first and second non-circular sections of the spindle respectively into the first and second non-circular apertures to lock the spindle against rotation with respect to the frame.

2. The device according to claim 1, in which the first and second non-circular sections of the spindle and the first and second non-circular apertures in the frame are square in section.

3. The device according to claim 1, further including a spacer mounted on the spindle configured to hold the first and second non-circular sections of the spindle out of the first and second non-circular apertures during rotation of the spindle, but configured to be able to be forced out of the way when the lock nut is tightened to displace the spindle.

4. The device according to claim 1, in which the first end of the strap is fixed to the frame.

5. The device according to claim 1, in which the first end of the strap is adapted to be held on the spindle.

6. The device according to claim 5, in which the spindle has at least one aperture into which the first end of the strap can be inserted in order to hold it in the spindle.

7. The device according to claim 1, in which the spindle has one or more apertures for insertion of the second end of the strap.

8. The device according to claim 3, wherein the spacer comprises an O-ring at an inner side of the first wall.

9. The device according to claim 8, wherein the O-ring sits on a taper located between the threaded end and the first non-circular section of the spindle.

* * * * *